(12) United States Patent
Madaiah

(10) Patent No.: US 10,432,682 B2
(45) Date of Patent: *Oct. 1, 2019

(54) METHOD AND SYSTEM OF REDIRECTING STREAMING CONTENT OVER A COMMUNICATION NETWORK

(71) Applicant: TEJAS NETWORKS LIMITED, Bangalore, Karnataka (IN)

(72) Inventor: Vinod Kumar Madaiah, Karnataka (IN)

(73) Assignee: TEJAS NETWORKS LIMITED, Bangalore (IN)

( * ) Notice: Subject to any disclaimer, the term of this patent is extended or adjusted under 35 U.S.C. 154(b) by 556 days.

This patent is subject to a terminal disclaimer.

(21) Appl. No.: 13/746,705

(22) Filed: Jan. 22, 2013

(65) Prior Publication Data

US 2013/0212225 A1   Aug. 15, 2013

(30) Foreign Application Priority Data

Jan. 22, 2012 (IN) .............................. 258/CHE/2012

(51) Int. Cl.
*G06F 15/16* (2006.01)
*H04L 29/06* (2006.01)

(52) U.S. Cl.
CPC .......... *H04L 65/60* (2013.01); *H04L 65/1073* (2013.01); *H04L 65/4084* (2013.01); *H04L 65/80* (2013.01)

(58) Field of Classification Search
USPC ........................................................ 709/219
See application file for complete search history.

(56) References Cited

U.S. PATENT DOCUMENTS

| | | | |
|---|---|---|---|
| 8,432,906 B2* | 4/2013 | Wu .............................. | 370/389 |
| 2003/0069884 A1* | 4/2003 | Nair et al. ....................... | 707/9 |
| 2009/0143090 A1* | 6/2009 | Mimura ................ | H04W 76/45 455/518 |
| 2010/0191858 A1* | 7/2010 | Thomas et al. ............... | 709/231 |
| 2011/0138064 A1* | 6/2011 | Rieger et al. ................. | 709/228 |
| 2011/0295974 A1* | 12/2011 | Kashef et al. ................ | 709/217 |
| 2012/0204217 A1* | 8/2012 | Regis et al. .................. | 725/116 |
| 2012/0239782 A1* | 9/2012 | Basavanahally et al. .... | 709/219 |
| 2013/0166762 A1* | 6/2013 | Jalan ...................... | H04L 61/00 709/228 |

* cited by examiner

*Primary Examiner* — Sm A Rahman
(74) *Attorney, Agent, or Firm* — Oliff PLC

(57) ABSTRACT

The present invention relates to a method and system of redirecting streaming content from one user equipment to the other available precise user equipment over a communication network. In one embodiment this is accomplished by registering a plurality of user equipments and a server with at least one lookup server, checking periodically integrity of the connection between the first user equipment and the lookup server, triggering, upon failure of connection, to identify the transfer of some or all incoming contents at the first UE to at least one second UE from the group of UEs registered with the lookup server and redirecting the transfer of the content of the lookup server from the first UE to the identified second available UE, wherein the redirection is based on the unique ID of the content.

9 Claims, 3 Drawing Sheets

METHOD AND SYSTEM OF REDIRECTING STREAMING CONTENT OVER A COMMUNICATION NETWORK

FIELD OF THE INVENTION

This application claims benefit of Serial No. 258/CHE/2012, filed 22 Jan. 2012 in India and which application is incorporated herein by reference. To the extent appropriate, a claim of priority is made to the above disclosed application.

The present disclosure relates generally to communication and more specifically to a method and system for managing communication sessions between two or more equipments.

BACKGROUND OF THE INVENTION

Traditional streaming of content during a session, however, is limited to a particular client that is utilized to access the content. When ordering a VOD (e.g., a movie), for instance, a session is initiated between a particular set-top box and a head end such that the movie is streamed to the particular set-top box. If the user wishes to view the movie utilizing a new client, however, a new session is initiated between the head end and the new client that is not aware of the previous session that was utilized to stream the content for output to the user. This lack of awareness may result in additional costs, such as to purchase conditional access rights to access the content utilizing the new client, in network bandwidth costs of networks utilized to stream the content, and so on.

Example: A user has two devices: UE1 (UE stands for user equipment) and UE2. UE 1 is mobile device with small screen and low data rate. UE 2 is a laptop with big screen and very high data rate. User wishes the video content that he was watching on the UE1 to be rendered on UE2. UE1 and UE2 may be physically far away connected either wirelessly or over wire to a network of same operator or different operator.

Example 2: Call transfer feature for voice call over IP network using Session Initiation Protocol. This is restricted to only VoIP. Here a user or receptionist picks the call and then redirects the incoming call to the appropriate extension. For some implementation it is possible to program a re-director such that without the intervention of a receptionist, the call will be redirected, either temporarily or permanently, to another phone number.

In the case of streaming of video content, due to the lack of awareness of the previous session between the user and the head end, even when the same session is initiated between a new client and the head end, the user is required to manually navigate through the content to continue output of the content at a corresponding point-in-time in the output of the session.

Accordingly, there is a continuing need for redirection of streaming content.

SUMMARY OF THE INVENTION

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one aspect of the present invention is a method of redirecting streaming content from one user equipment to the other available precise user equipment from the lookup server over a communication network, the method comprising: registering a plurality of user equipments and a server with at least one lookup server, wherein the plurality of user equipments including a first user equipment and a second user equipment, the first user equipment, the second user equipment and the server are tagged with a unique identifier, checking periodically integrity of the connection between the user equipments and the lookup server, triggering, upon notification, to identify the transfer of some or all incoming contents at the first UE to at least one second UE from the group of UEs registered with the lookup server and redirecting the transfer of the content of the server from the first UE to the identified second available UE, wherein the redirection is based on the unique ID of the content.

In another aspect of the present invention is a system of redirecting streaming content in a communication network, the system comprising: a plurality of user equipments, at least one server having content and at least one look up server operatively configured to the plurality of user equipments and the server over the communication network, wherein the lookup server is configured for, registering a plurality of user equipments and a server with at least one lookup server, wherein the plurality of user equipments including a first user equipment and a second user equipment, the first user equipment, the second user equipment and the server are tagged with a unique identifier, checking periodically integrity of the connection between the user equipments and the lookup server, triggering, upon notification, to identify the transfer of some or all incoming contents at the first UE to at least one second UE from the group of UEs registered with the lookup server and redirecting the transfer of the content of the server from the first UE to the identified second available UE, wherein the redirection is based on the unique ID of the content.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the detailed description of the invention below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

Figure 1:
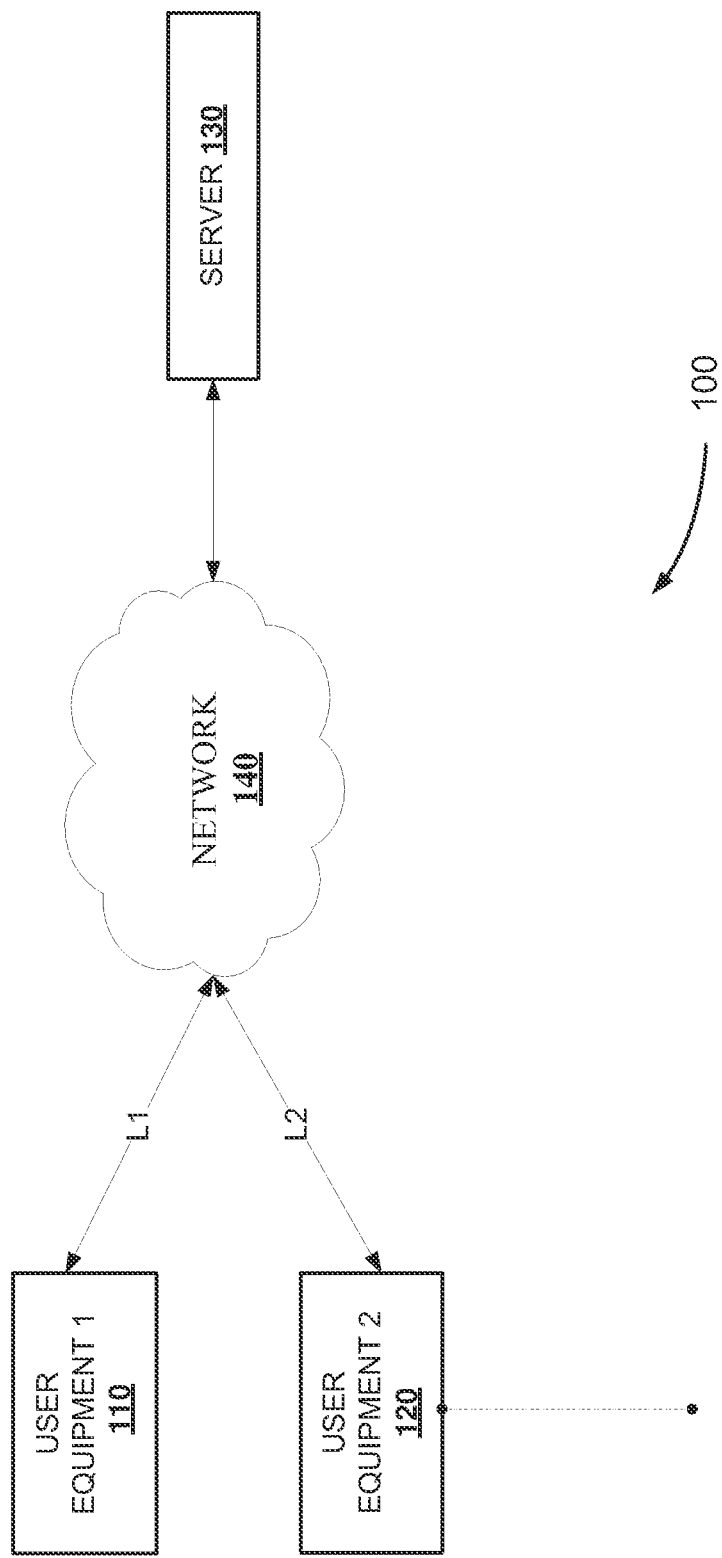
FIG. 1 illustrates an exemplary system in which data may be streamed between two or more nodes in a network.

Persons skilled in the art will appreciate that elements in the figures are illustrated for simplicity and clarity and may have not been drawn to scale. For example, the dimensions of some of the elements in the figure may be exaggerated relative to other elements to help to improve understanding of various exemplary embodiments of the present disclosure.

Throughout the drawings, it should be noted that like reference numbers are used to depict the same or similar elements, features, and structures.

DETAIL DESCRIPTION OF THE INVENTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled or described as "computer", "processor" or "controller" may be provided through the use of dedicated hardware as well as hardware capable of executing software in the form of coded instructions stored on computer readable medium. A computer is generally understood to comprise one or more processors, and the terms computer and processor may be employed interchangeably herein. When provided by a computer or processor, the functions may be provided by a single dedicated computer or processor, by a single shared computer or processor, or by a plurality of individual computers or processors, some of which may be shared or distributed. Such functions are to be understood as being computer-implemented and thus machine-implemented. Moreover, use of the term "processor" or "controller" shall also be construed to refer to other hardware capable of performing such functions and/or executing software, and may include, without limitation, digital signal processor (DSP) hardware, reduced instruction set processor, hardware (e.g., digital or analog) circuitry, and (where appropriate) state machines capable of performing such functions.

FIG. 1 illustrates an exemplary system in which data may be streamed between two or more nodes in a network. The system 100 includes one or more user equipments (110, 120), a server 130, where the user equipments 110, 120 communicates with the server via a network 140 over link L1 and link L2. The user equipments 110, 120 may include a portable terminal, a mobile terminal, a personal digital assistant (PDA), an MP3 player, a PSP, and the like, which are capable of storing or reproducing multimedia. Referring to FIG. 1, the server may be or may includes a network processor, a transmitter, a receiver, a meta interface (IF) processor, a user interface, a media redirection processor, an optimum UI determiner, an announcement processor, a device and service information provider, a media player component, a mobile code provider and processor, a media source processor, an environment monitor, and a controller. The server 130 is responsible for receiving data for connecting with user equipments. The server 130 is also responsible for receiving data for the connection from the user equipments over the network 140. For example, upon a multimedia request from the user equipments, the server reproduces a multimedia stream selected according to a user's request. Also, the server is responsible for managing a database (DB) (not shown in figure) which converts the multimedia stream to data and stores the same.

Figure 2:
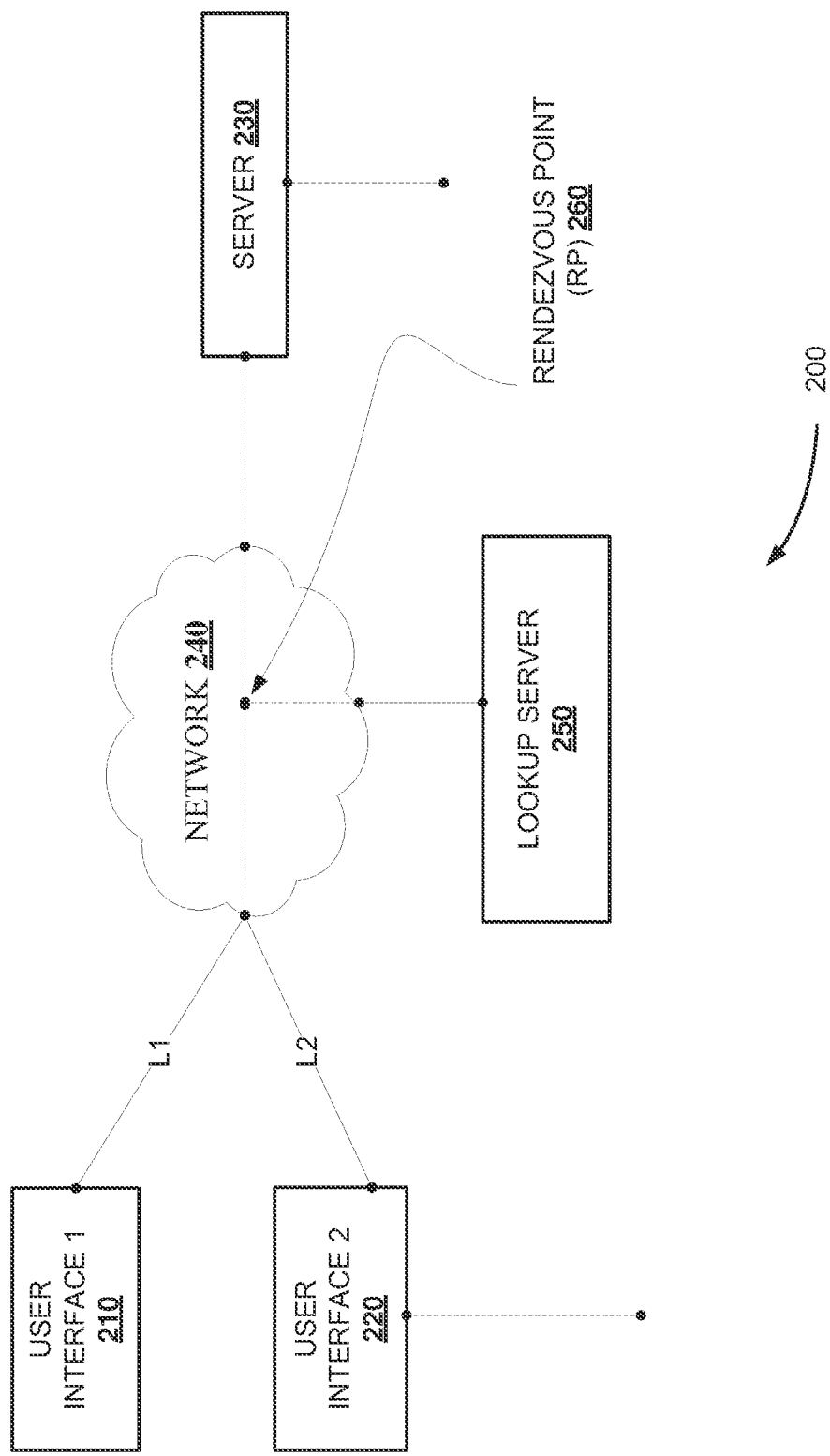
FIG. 2 illustrates an exemplary system of redirecting streaming content in a communication network according to one embodiment of the present invention.

FIG. 2 illustrates an exemplary system of redirecting streaming content in a communication network according to one embodiment of the present invention. The system 200 includes one or more user equipments (210, 220), a server 230, and a lookup server 250. The user equipments 210, 220 communicate with the network 240 over link L1 and link L2.

The user equipments 210, 220 may include a portable terminal, a mobile terminal, a personal digital assistant (PDA), an MP3 player, a PSP, and the like, which are capable of storing or reproducing multimedia.

The server 230 may be or may include a network processor, a transmitter, a receiver, a meta interface (IF) processor, a user interface, a media redirection processor, an optimum UI determiner, an announcement processor, a device and service information provider, a media player component, a mobile code provider and processor, a media source processor, an environment monitor, and a controller.

Also, the server is responsible for managing a database (DB) (not shown in figure) which converts the multimedia stream to data and stores the same.

The lookup server 250 may be or may include any standard data processing means or computer, including a minicomputer, a microcomputer, a UNIX® machine, a mainframe machine, a personal computer (PC) such as INTEL® based processing computer or clone thereof, an APPLE® computer or clone thereof or, a SUN® workstation, or other appropriate computer. Lookup server generally includes conventional computer components (not shown), such as a motherboard, central processing unit (CPU), random access memory (RAM), hard disk drive, display adapter, other storage media such as diskette drive, CD-ROM, flash-ROM, tape drive, PCMCIA cards and/or other removable media, a monitor, keyboard, mouse and/or other user interface means, a modem, and/or other conventional input/output devices. Lookup server also includes a Network Interface for communication with other computers using an appropriate network protocol.

In an operation, End nodes (UEs and servers) register their ID (Unique Registration ID or URI) with lookup server. UEs belonging to a user are grouped together under one User ID. Each UE's URI has physical address associated with it . . . example IP address, Tunnel ID, MAC address, Telephone number, etc. When a UE is connected to a network, the lookup server is notified about the physical address also. When user enters a particular servers ID to source a video content onto the UE1 210, the UE's URI is notified to the lookup server 250. UE1 210 requests the lookup server 250 for physical address of the server 230 matching the server ID. The lookup server 250 will return the physical address of the server 230 if available. If not, then the lookup server 250 will request other lookup servers (not shown in figure) for the information. Once UE1 210 receives physical address of the server 230, it will be able to download the video. A download of video is assigned a session ID by end nodes and which is stored by all intermediate network nodes (router, bridges, etc.). The network nodes, like RP (Rendezvous Point 260), also store associated URIs and optionally physical address. The Rendezvous Point (RP) can be within UE, Server, Router, bridges, proxy servers, serving gateway, packet data network gateway, IMS server, etc. If the existing session encounters fault, then network nodes will detect reason of failure and try to reestablish the same session with alternate end nodes by switching or re-directing stream to alternate URI of the user.

In the present system, topology is not fixed and not restricted to end nodes connecting to fixed topology. The topology is routing topology over IP network or like and hence dynamic and not fixed. End nodes only know the ID and session ID. Topology knowledge of how to reach the end nodes or connect the end nodes is learnt by the end nodes and network nodes from the physical address and associated routing or bridging protocols. In this way session re-direction is network assisted. Buffering in the network is used while redirection or switching or sourcing.

Also, because of the presence of Rendezvous Point, the present invention is capable of doing multicasting and broadcasting. Also, the present system 200 can perform protection switching of unicast, multicast and broadcast traffic.

Figure 3:
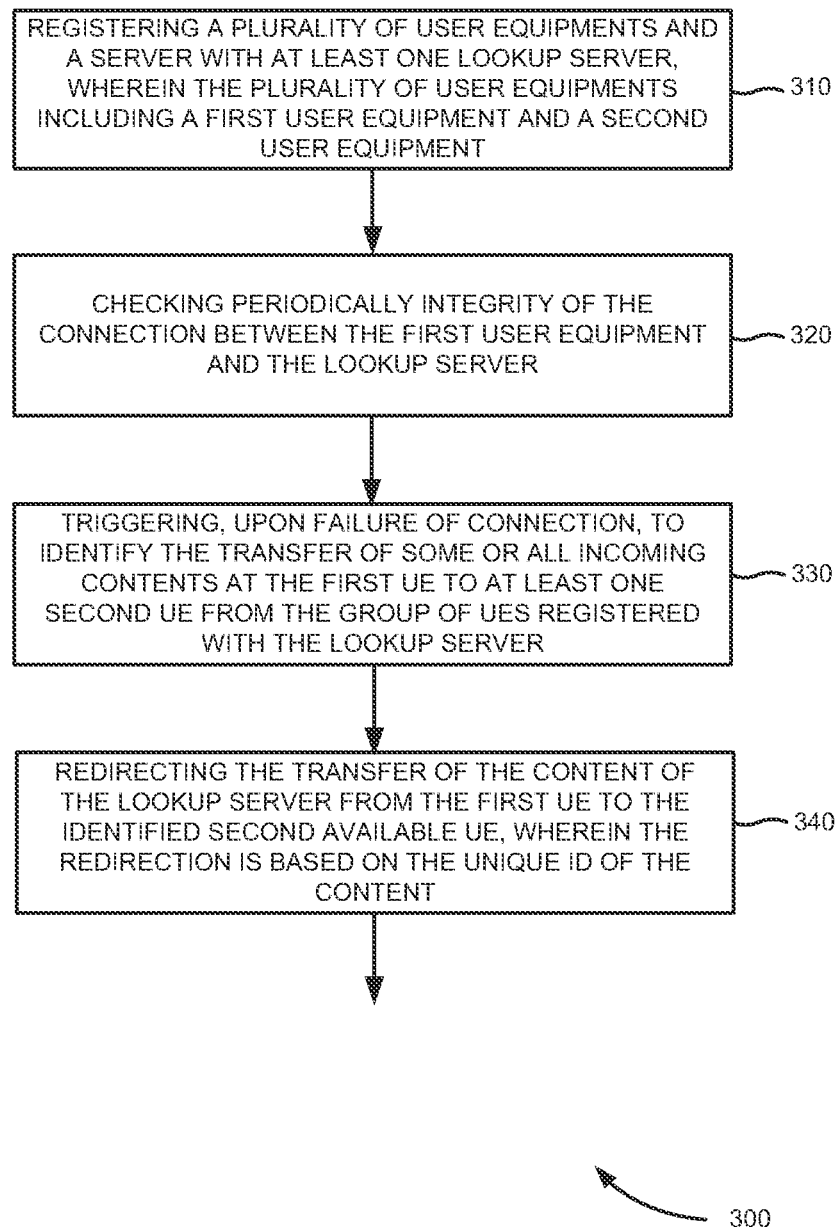
FIG. 3 illustrates an exemplary generalized operational flow including various operations that may be performed while redirecting streaming content from one user equipment to the other available precise user equipment from the lookup server over a communication network according to one embodiment of the present invention.

FIG. 3 illustrates an exemplary generalized operational flow including various operations that may be performed while redirecting streaming content from one user equipment to the other available precise user equipment from the lookup server over a communication network according to one embodiment of the present invention.

At step 310, the method registers one or more user equipments and a server with at least one lookup server, where one or more user equipments includes a first user equipment and a second user equipment, the first user equipment, the second user equipment and the server are tagged with a unique identifier. The registering user equipment IDs and plurality of server IDs with at least one lookup server based on capabilities including screen size, encoding/decoding method for content, average data rate, buffer size, fixed device or mobile device etc.

At step 320, the method checks periodically integrity of the connection between the first user equipment and the lookup server. Checking the integrity of the connection between the content source and the user equipments by way of TCP acknowledgement, Continuity Check Message (CCM) of CFM IEEE 802.1ag, BFD (bidirectional fault detection), etc.

At step 330, the method triggers, upon notification, to identify the transfer of some or all incoming contents at the first UE to at least one second UE from the group of UEs registered with the lookup server. The notification may include user generated transfer request, transfer request generated by one of the user equipments, failure of connection, etc. Further, the method triggers to identify the transfer of the content from the first UE to the available second UE is at a rendezvous point, wherein the rendezvous point is that point which facilitates protection switching, unicasting, multicasting and broadcasting of the content to other available UE registered with the lookup server. Further identifying the transfer of some or all incoming contents of the contents source to at least one second UE from the group of UEs registered is based on whether the second UE superior positioned to serve or display or render the contents.

The rendezvous point further facilitates in faster restoration of the connection thereby rendering the content on the next available UE from the first UE. The rendezvous point further facilitates in faster restoration of the connection by changing the sourcing of content from one server to other server (when traffic is sourced by server 1, upon failure of server 1, is sourced by server 2 (not shown in figure)). The rendezvous point can be within UE, Server, Router, bridges, proxy servers, serving gateway, packet data network gateway, IMS server, etc. The rendezvous point is also capable of buffering traffic temporarily, wherein the rendezvous point further stores session ID and list of UEs and servers associated with this session ID, and wherein the rendezvous point also stores alternate UE IDs and Server IDs to which the RP will 're-direct to' or 're-source from' the session.

At step 340, the method redirects the transfer of the content of the server from the first UE to the identified second available UE, wherein the redirection is based on the unique ID of the content.

Although the method flowchart includes steps 310-340 that are arranged logically in the exemplary embodiments, other embodiments of the subject matter may execute two or more steps in parallel, using multiple processors or a single processor organized as two or more virtual machines or sub-processors. Moreover, still other embodiments may implement the steps as two or more specific interconnected hardware modules with related control and data signals communicated between and through the modules, or as portions of an application-specific integrated circuit. Thus, the exemplary process flow diagrams are applicable to software, firmware, and/or hardware implementations.

FIGS. 1-3 are merely representational and are not drawn to scale. Certain portions thereof may be exaggerated, while others may be minimized. FIGS. 1-3 illustrate various embodiments of the invention that can be understood and appropriately carried out by those of ordinary skill in the art.

I claim:

1. A method of redirecting streaming content from one user equipment to other available precise user equipment from a lookup server over a communication network, the method comprising:
   registering a plurality of User Equipment (UE) and a server with at least one lookup server, wherein the plurality of User Equipment comprises a first User Equipment (UE) and at least one second User Equipment (UE), each of the first UE, the at least one second UE and the server are tagged individually with a unique identifier, and wherein each unique identifier is associated with a physical address;
   sourcing a content onto the first UE, wherein the first UE requests the lookup server for the physical address, matching with the physical address associated with the unique identifier of the server, wherein a session ID is assigned to a session, established on sourcing the content;
   checking periodically integrity of the connection between the plurality of UE and the lookup server;
   triggering, upon notification, to identify transfer of some or all content at the first UE to an available second UE from the at least one second UE, wherein triggering to identify the transfer of the some or all content from the first UE to the available second UE is at a rendezvous point, wherein the rendezvous point facilitates in restoring connection by changing the sourcing of the content from one server to other server that is registered with the lookup server; and
   redirecting the transfer of the content of the server from the first UE to the available second UE in the established session, wherein the redirection is based on the unique identifier of the server comprising the content.

2. The method of claim 1, wherein the rendezvous point is that point which facilitates protection switching, unicasting, multicasting and broadcasting of the content to the available second UE registered with the lookup server.

3. The method of claim 1, wherein the rendezvous point further facilitates in restoration of the connection by rendering the content on the available second UE from the first UE.

4. The method of claim 1, wherein the rendezvous point is within at least one selected from the group consisting of UE, Server, Router, bridges, proxy servers, serving gateway, packet data network gateway, and IMS server.

5. The method of claim 1, wherein the rendezvous point is capable of buffering traffic temporarily, wherein the rendezvous point further stores session ID and list of UEs and servers associated with this session ID, and wherein the rendezvous point also stores alternate UE IDs and server IDs to which the rendezvous point re-direct to or re-source from the session.

6. The method of claim 1, wherein the step of checking periodically integrity of the connection between the lookup server and the plurality of UE is by way of at least one of Transmission Control Protocol (TCP) acknowledgement, Continuity Check Message (CCM) of CFM IEEE 802.1ag, and BFD (Bidirectional Fault Detection).

7. The method of claim 1, wherein registering the plurality of UE and plurality of server with at least one lookup server is based on capabilities selected from the group consisting of screen size, encoding/decoding method for content, average data rate, buffer size, and one of fixed device and mobile device.

8. The method of claim 1, wherein identifying the transfer of some or all content to the available second UE from the at least one second UE is based on whether the available second UE is compatible to display or render the content.

9. A system of redirecting streaming content in a communication network, the system comprising:
   a plurality of user equipment (UE);
   at least one server having content; and
   at least one lookup server operatively configured to the plurality of UE and at least the one server over the communication network;
   wherein the lookup server is configured to:
   register the plurality of UE and the at least one server with at least one lookup server, wherein the plurality of UE comprises a first User Equipment (UE) and at least one second User Equipment (UE), each of the first UE, the at least one second UE and the at least one server are tagged individually with a unique identifier, and wherein each unique identifier is associated with a physical address;
   source a content onto the first UE, wherein the first UE requests the lookup server for the physical address, matching with the physical address associated with the unique identifier of at least the one server, wherein a session ID is assigned to a session, established on sourcing the content;
   check periodically integrity of the connection between the first UE and the lookup server;
   trigger, upon notification, to identify the transfer of some or all contents at the first UE to an available second UE from the at least one second UE, wherein triggering to identify the transfer of the content from the first UE to the available second UE is at a rendezvous point, wherein the rendezvous point facilitates in restoring connection by changing the sourcing of the content from one server to other server that is registered with the lookup server; and
   redirect the transfer of the content of the server from the first UE to the available second UE in the established session, wherein the redirection is based on the unique identifier of the server comprising the content.

* * * * *